United States Patent [19]

Yamakawa et al.

[11] 3,895,362

[45] July 15, 1975

[54] INTEGRATED MAGNETIC WIRE MEMORY

[75] Inventors: Masaaki Yamakawa, Tokyo; Isamu Kashiwagi, Kawasaki; Akio Tomono, Tokyo, all of Japan

[73] Assignee: Oki Electric Industry Co., Ltd., Tokyo, Japan

[22] Filed: May 18, 1973

[21] Appl. No.: 361,588

[30] Foreign Application Priority Data

June 2, 1972 Japan ............................ 47-54365
Oct. 12, 1972 Japan ............................ 47-101577

[52] U.S. Cl. .................... 340/174 PW; 340/174 BA; 340/174 BC; 340/174 MA; 340/174 TF

[51] Int. Cl. ............................ G11c 11/14

[58] Field of Search.. 340/174 TF, 174 PW, 174 BC

[56] References Cited

UNITED STATES PATENTS

| | | | |
|---|---|---|---|
| 3,585,616 | 6/1971 | Mazzeo | 340/174 BC |
| 3,604,109 | 9/1971 | Crimmins | 340/174 BC |
| 3,623,032 | 11/1971 | Schapira | 340/174 BC |
| 3,775,758 | 11/1973 | Kobayashi et al. | 340/174 BC |

OTHER PUBLICATIONS

IBM Technical Disclosure Bulletin – Vol. 8; No. 11, Apr. 1966, pp. 1615–1616.

*Primary Examiner*—James W. Moffitt
*Attorney, Agent, or Firm*—Oblon, Fisher, Spivak, McClelland & Maier

[57] ABSTRACT

An integrated magnetic wire memory comprising a plurality of coplanar magnetic wires parallelly arranged, an insulating film disposed about and enclosing said magnetic wires, a plurality of U-shaped conductive non-magnetic wires disposed adjacent to and in contact with said insulating film, said U-shaped non-magnetic wires being further disposed in a plane parallel to the plane of said magnetic wires and in a direction perpendicular to the projected direction of said magnetic wires, the projected intersection of a U-shaped non-magnetic wire and a magnetic wire forming a memory cell, the end portions of each of said U-shaped non-magnetic wires being disposed beyond said insulating film in such a manner that the total peripheral surface of said end portions is disposed beyond and in non-contact with said insulating film, a plurality of keeper members with one keeper member for each of said U-shaped non-magnetic wires, each keeper member being formed of magnetic material of high permeability, each keeper member being disposed to form a partial peripheral layer about a U-shaped non-magnetic wire so that each U-shaped non-magnetic wire is totally enclosed with the exception of its end portions by a keeper member and by said insulating film, the end portions of each of said U-shaped non-magnetic wires being only partially enclosed by each of said keeper members in order to facilitate circuitry connection.

2 Claims, 3 Drawing Figures

INTEGRATED MAGNETIC WIRE MEMORY

BACKGROUND OF THE INVENTION

1. Field of the Invention

This invention relates to an integrated magnetic wire memory for use in data-processing systems such as an electronic computer, electronic switching system or the like and more specifically to an integrated magnetic wire memory comprising planes having word wires arrayed and placed directly on memory plane sub-units to intersect at a right angle with magnetic wires of the memory plane sub-units.

2. Description of the Prior Art

Recent developments in data-processing systems accompany an increasing demand for miniaturized, high-efficient and inexpensive memory devices. Various types of magnetic wire memories using electrodeposited magnetic wires as memory cells have been contemplated to satisfy such a demand and some of them already put into use. In such known magnetic wire memories, electrodeposited magnetic wires (herein called "magnetic wires"for brevity) which are made of highly conductive wire materials plated with magnetic thin films to place the peripheral direction in its easy direction of magnetization have been coplanarly arranged and securedly covered by a flexible film such as a polyester film, so as to form a memory plane sub-unit. Non-magnetic, conductive fine wires (herein called "word wires") are arranged to intersect such a memory plane sub-unit to provide unit memory cells in the intersections. In order to position the word wires in intersection with the memory plane sub-unit there have been known the various conventional methods of (1) coiling word wires directly around a memory plane sub-unit and bonding together each other with adhesives; or (2) winding word wires onto a separate base to which a memory plane sub-unit is bonded; or (3) providing a flexible film having a plurality of tunnels of a slightly greater diameter than that of magnetic wires at such desired intervals as to form an array of magnetic wires and inserting magnetic wires into each tunnel of said flexible film which is then bonded to a memory plane sub-unit.

In the aforesaid conventional methods (1) and (2) as having the steps of winding or coiling word wires onto a memory plane sub-unit or a base, however, diversity in spaces of turns of the windings and also dislocation of the word wires on the opposite sides have been likely to occur. If they take place disturbance of magnetic field applied to each unit memory cell is caused to narrow operative range of such a memory. Precision in size has been unable to be raised to a desired degree in winding or coiling steps of such methods. The conventional method (3) has not been suitable for mass production since it involves extremely complicated steps of providing a flexible film of tunnels disposed and inserting magnetic wires into such tunnels. Any memory obtained in accordance with any aforesaid conventional methods has been extremely inferior in operative efficiency due to a substantial distance occuring between word wires and magnetic wires because a layer of adhesive or a base lie therebetween in addition to a memory plane sub-unit forming film. Moreover, inability or difficulties have been experienced in miniaturizing such conventional memories and enhancing their mounting density because of expected danger of an increasing undesirable influence on contiguous bits.

In order to enhance magnetic focusing to a degree required for storing data in the conventional art, a keeper plate of high permeability, Permalloy or ferrite, has been bonded to word wires or alternatively word wires have been embedded in such a keeper plate.

However, the first arrangement has not assuredly obtained a sufficient degree of focusing when current exists in word wires since a keeper member faces word wires merely on one side. High density of integration has been difficult to achieve in the latter one because it depends upon density (number) of word wires embedded per unit area.

SUMMARY OF THE INVENTION

Accordingly, an object of this invention is to provide an extremely miniaturized, integrated magnetic wire memory of a simple construction which can be manufactured at lower costs.

A further object of this invention is to provide an integrated magnetic wire memory particularly of high operative efficiency.

A still further object of this invention is to provide an integrated magnetic wire memory of a reduced size having a prominent degree of focusing of magnetic fields.

The other objects, characteristics and advantages of the invention will be sufficiently understood in the following description:

DETAILED DESCRIPTION OF THE PREFERRED EMBODIMENTS

Figure 1:
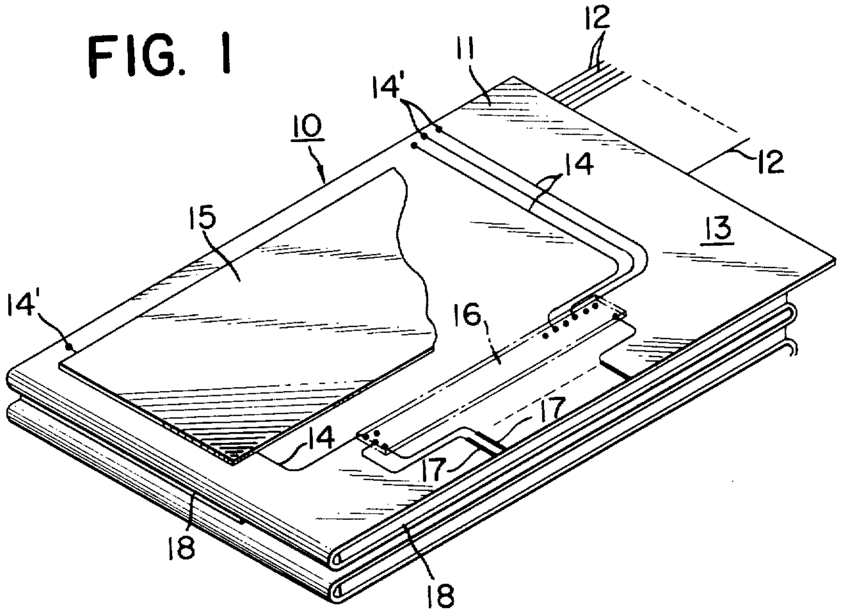
FIG. 1 is an elevational view of a magnetic wire memory embodying the invention.
Figure 2:
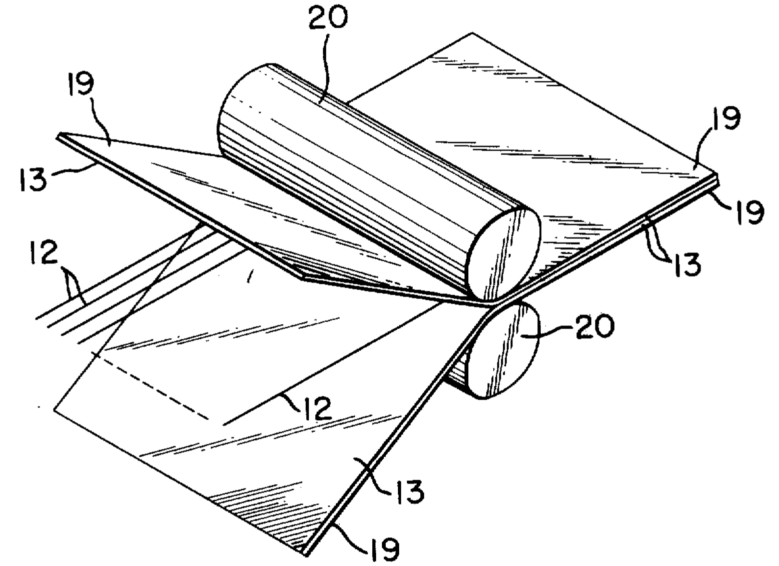
FIG. 2 illustrates steps of manufacturing magnetic wires used in the magnetic wire memory in accordance with the invention.

FIG. 1 shows an integrated magnetic memory comprising overlapped memory planes 10 embodying the invention. Each memory plane 10 comprises a memory plane sub-unit 11 including a plurality of magnetic wires 12 covered by a flexible, insulating film 13 of a relatively low fusing point material, such as polyethylene or the like, a plurality of word wires 14 made of a non-magnetic material and disposed directly on the memory plane sub-unit 11 to perpendicularly intersect said magnetic wires 12, and a keeper member 15 of high permeability placed on said word wires 14 to enhance permeability of magnetic field.

In a first step of providing said memory plane 10 a film of high conductivity, for instance a copper film, has to be fixed onto a surface of the polyester film 13 of the said memory plane sub-unit 11. This may be performed by vacuum evaporation. A generally adopted chemical plating method will herein be exemplified as a process for depositing a copper film on opposite surfaces of the memory plane sub-unit 11. Such a copper film deposition method generally comprises the request steps of degreasing a memory plane sub-unit (by a 30 second's dip in a 50°C solution of 10g of NaOH, 20g of $Na_2CO_3$ and 5g of $H_3PO_4$ respectively per liter), rinse, chemical etching (by 7 minute's dip in a 80°C solution of 100 to 300g of NaOH per liter), rinse, acid pickling (by 10 seconds dip in a normal temperature solution of 1 percent of HCl), rinse, sensitization (by 2 minutes dip in a normal temperature solution of 20g of $SnCl_2.2H_2O$ and 25cc of HCl per liter), rinse, activation (by 2 minutes dip in a normal temperature solution of 0.2g of $PdCl_2$ and 10cc of HCl per liter), rinse, copper chemical plating (to a thickness of 0.5μ utilizing Copper Mix 328 available from Shipkely Corporation), rinse, copper electroplating (in a normal temperature bath of 150 to 250g of $CaSO_4.7H_2O$ and 10 to 40g of $H_2SO_4$ per liter and 9 current density of 1 to 8 A/dm$^2$), and rinse.

The films 13 obtained through the above steps to have the copper films 19 deposited on its surfaces are interposingly provided with a precision array of magnetic wires 12 spaced at predetermined intervals by separator means or other and heat-pressed by means of heating rollers 20 upon its surfaces of the copper films 19 to provide the memory plane sub-unit 11 having the copper films 19 on its opposite faces.

Patterns of the word wires are then sintered onto the memory plane sub-unit 11 of copper films on the opposite sides so as to intersect at a right angle the magnetic wires 12 of the memory plane sub-unit 11, which is followed by an etching process. The memory plane 10 is thus obtained wherein the word wires 14 are disposed in a perpendicular intersection with the magnetic wires 12 of the memory plane sub-unit 11 to form memory cells in the intersections.

A substantially greater width of the memory plane sub-unit 11 than that of a region occupied by the arrayed magnetic wires 12 may be provided to afford a vacant area in which peripheral circuitry 16 such as a word selection matrix circuit or connection terminals 17 may collectively be formed so that a number of connections to outside may be diminished. A base plate or other may be bonded to such a region disposing the peripheral circuitry 16, the connection terminals 17 or the like, if desirable, in order to provide mechanical strength to said region. Terminals 14' placed at the ends of the word wires 14 are directed to connection between the word wires formed on the opposite surfaces of the memory plane sub-unit 11.

The word wires 14 disposed on the memory plane sub-unit 11 in the aforesaid manner are directly covered by a keeper member 15 in order to enhance focusing of magnetic field caused by current therein upon storing data. This may be effectuated by coating or pressure fixing a magnetic material of high permeability such as ferrite or other. The method is adopted in this embodiment whereby the word wires 14 are electroplated with Permalloy, or specifically bathed in a pH2.5 solution of 30g of $H_3BO_3$, 20 to 100g of $NiCl_2$. $6H_2O$, 5 to 10g of $NiSO_4$. $7H_2O$, 3 to 10g of $FeSO_4$.7-$H_2O$, 1g of saccharinic soda and 0.5g of soda lauryl sulfate. It is preferred that magnetostriction of the keeper material should be zero. Each word wire 14 is thereby covered directly by the keeper member 15.

The memory plane 10 thus integrally having the memory plane sub-unit 11 and word wires 14 is bonded to a base 18 of a predetermined length for physical strengthening and then overlappingly folded to provide a memory in accordance with the invention.

Figure 3:
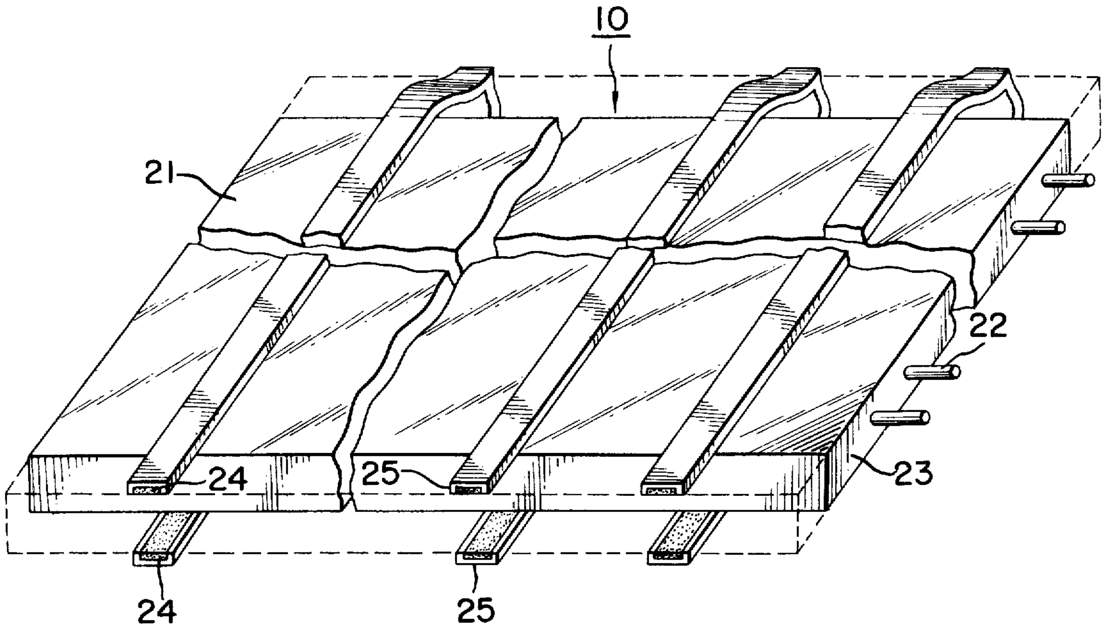
FIG. 3 is an elevational view of a modified memory plane manufactured by the steps shown in FIG. 2.

FIG. 3 shows a modification of the memory plane 10 of a full turn wherein word wires lie on opposite surfaces of a memory plane sub-unit. It comprises a memory plane sub-unit 21 having magnetic wires 22 covered with a polyester film 23, word wires 24 of a non-magnetic material perpendicularly intersecting said magnetic wires 22, and keeper members 25 casing said word wires 24 to increase permeability of magnetic field. The keeper members 25 are disposed to cover merely the upper, front and rear sides of the word wires. In order to connect the word wires 24 formed on the both surfaces of the memory plane sub-unit 21, both marginal side portions of said memory plane sub-unit 21 may be processed through chemical etching to remove regions of the polyester films 23 illustrated in dotted lines and exposed copper films of the word wires 24 on the surfaces of the memory plane sub-unit 21 soldered together.

It is to be understood that the same effect as that of the above explained modification having a memory plane sub-unit 11, 21 and word wires 14, 24 arranged in a full turn can be achieved by another arrangement of a half turn wherein the identical word wires 14, 24 are disposed to face the memory plane sub-unit 11, 21 on one surface thereof.

In the magnetic memory of this invention heretofore explained, direct arrangement of the word wires onto the memory plane sub-unit enables distance therebetween to be decreased to a great extent so that the unit may be miniaturized and also operative efficiency of word current may highly be enhanced. Operative efficiency of word current thus heightened may be still more improved by action of the keeper members formed on the word wires. Such improvement of word current operative efficiency permits the memory to be operable by small current so as to eliminate undesirable effects on contiguous bits. Thus, bit density may be raised and circumstances of peripheral circuitry as well greatly improved, which permits the memory to be miniaturized, economized and accelerated in its operation. A word selection matrix circuit may be formed collectively with word wires in the aforesaid etching step to eliminate need of connection means therebetween and extremely diminish a number of connections with outer devices. Economical advantages are obtained and reliability of thus manufactured memories are highly improved because some steps may be dismissed.

Obviously, numerous modifications and variations of the present invention are possible in light of the above teachings. It is therefore to be understood that within the scope of the teachings herein and the appended claims, the invention may be practiced otherwise than as specifically described herein.

What is claimed as new and desired to be secured by Letters Patent of the United States is:

1. An integrated magnetic wire memory comprising:

a plurality of coplanar magnetic wires parallelly arranged, an insulating film disposed about and enclosing said magnetic wires, a plurality of U-shaped conductive non-magnetic wires disposed adjacent to and in contact with said insulating film, said U-shaped non-magnetic wires being further disposed in a plane parallel to the plane of said magnetic wires and in a direction perpendicular to the projected direction of said magnetic wires, the projected intersection of a U-shaped non-magnetic wire and a magnetic wire forming a memory cell, the end portions of each of said U-shaped non-magnetic wires being disposed beyond said insulating film in such a manner that the total peripheral surface of said end portions is disposed beyond and in non-contact with said insulating film, a plurality of keeper members with one keeper member for each of said U-shaped non-magnetic wires, each keeper member being formed of magnetic material of high permeability, each keeper member being disposed to form a partial peripheral layer about the entire length of its U-shaped non-magnetic wire so that each U-shaped non-magnetic wire is shielded from adjacent U-shaped non-magnetic wires along its entire length by its keeper member.

2. An integrated magnetic wire memory in accordance with claim 1, wherein said U-shaped non-magnetic wires are comprised of copper, said insulating film is comprised of a polyester material, and said keeper members are comprised of ferrite having a magnetostriction value of substantially 0.

* * * * *